(12) United States Patent
Lim et al.

(10) Patent No.: US 9,490,692 B2
(45) Date of Patent: Nov. 8, 2016

(54) CIRCUIT AND METHOD OF CORRECTING A POWER FACTOR FOR AC DIRECT LIGHTING APPARATUS

(71) Applicant: Magnachip Semiconductor,Ltd., Chungcheongbuk-do (KR)

(72) Inventors: Gyu Ho Lim, Cheongju-si (KR); Jin Wook Kim, Cheongju-si (KR); Jong Hyun Yoon, Cheongju-si (KR)

(73) Assignee: MagnaChip Semiconductor, Ltd. (KR)

( * ) Notice: Subject to any disclaimer, the term of this patent is extended or adjusted under 35 U.S.C. 154(b) by 0 days.

(21) Appl. No.: 14/661,716

(22) Filed: Mar. 18, 2015

(65) Prior Publication Data
US 2016/0065055 A1    Mar. 3, 2016

(30) Foreign Application Priority Data
Aug. 29, 2014 (KR) .......................... 10-2014-0113846

(51) Int. Cl.
*H05B 33/08* (2006.01)
*H02M 1/42* (2007.01)

(52) U.S. Cl.
CPC ....... *H02M 1/4208* (2013.01); *H05B 33/0824* (2013.01); *H05B 33/0845* (2013.01); *H02M 2001/4291* (2013.01)

(58) Field of Classification Search
CPC .............. H05B 33/08; H05B 33/0815; H05B 33/0803; H05B 33/0824; H05B 33/0845; H02M 1/42; H02M 1/4208; H02M 1/4225; H02M 2001/4291
USPC ........ 315/200 R, 209 R, 246, 247, 291, 294, 315/307, 308; 323/207, 222, 224, 272, 282; 363/21.04, 21.12, 21.16, 86, 89, 97, 363/98, 127
See application file for complete search history.

(56) References Cited

U.S. PATENT DOCUMENTS

| | | | | |
|---|---|---|---|---|
| 8,094,468 B2* | 1/2012 | Yang | ................... | H02M 3/3376 363/21.01 |
| 8,148,956 B2* | 4/2012 | Hwang | ................... | G05F 1/70 323/207 |
| 8,587,209 B2* | 11/2013 | Soleno | ............... | H05B 33/0815 315/206 |
| 2005/0219871 A1* | 10/2005 | Li | ....................... | H02M 1/4225 363/21.1 |
| 2009/0273330 A1* | 11/2009 | Sisson | ..................... | G05F 1/70 323/288 |
| 2010/0109615 A1 | 5/2010 | Hwang et al. | | |

* cited by examiner

*Primary Examiner* — Thai Pham
(74) *Attorney, Agent, or Firm* — McGuire Woods LLP (57) ABSTRACT

A circuit for correcting a power factor for an AC direct lighting apparatus that includes a valley signal generating unit configured to receive a full-wave rectified AC input voltage signal and configured to compare an internal reference voltage signal and the AC input voltage signal to generate a valley signal, a reference voltage control unit configured to receive the generated valley signal and count clock cycles of an internal clock to detect a frequency of the AC input voltage signal and configured to determine a frequency of a drive current to control a reference voltage signal based on the determined frequency of the drive current and a reference voltage control clock generating unit configured to generate a pulse width modulation signal associated with a pulse width of the reference voltage signal and configured to generate the reference voltage control clock signal based on the generated pulse width modulation signal and the controlled reference signal. Thus, the circuit may control a phase of a drive current and adjust a variation of the reference voltage signal to improve the power factor of the circuit.

20 Claims, 9 Drawing Sheets

CIRCUIT AND METHOD OF CORRECTING A POWER FACTOR FOR AC DIRECT LIGHTING APPARATUS

CROSS-REFERENCE TO RELATED APPLICATIONS

This application claims the benefit under 35 USC 119 of Korean Patent Application No. 10-2014-0113846, filed on Aug. 29, 2014, in the Korean Intellectual Property Office, the entire disclosure of which is incorporated herein by reference for all purposes.

BACKGROUND OF THE DISCLOSURE

1. Field

This disclosure relates to power factor correcting technology, and, more particularly, to a power factor correcting circuit and a method for correcting a power factor in an AC-powered lighting apparatus.

2. Description of Related Art

Solid-state light emitting devices such as, for example, LEDs (light emitting diodes) are commonly known to consume less power than conventional, non-solid-state lighting devices, such as, for example, halogen devices, cathode ray tube (CRT) devices, and the like. Because of their lower power consumption, LED lighting devices (or apparatuses) have grown in popularity, replacing most conventional non-LED lighting devices. Some of the more recent LED lighting devices use alternating current (AC) direct drive circuits to power the devices, instead of using direct current (DC) drive circuits.

AC direct drive circuits may impose weight and space restrictions on an LED lighting device. Additionally, AC direct drive circuits frequently experience differences in phase between an input voltage and an output current, resulting in generation of reactive power and increased power dissipation in the LED lighting device. It may be difficult to adjust for frequency drift of an AC input voltage signal with respect to a drive current signal in an AC direct drive circuit for an AC lighting device.

SUMMARY OF THE DISCLOSURE

According to principles of the instant disclosure, a power factor correcting circuit and a method for correcting a power factor in an AC direct lighting apparatus are disclosed. The power factor correcting circuit and method may correct a power factor by changing a frequency of a drive current to decrease a phase difference between an AC input voltage signal and a drive current signal.

The power factor correcting circuit and method may correct a power factor by adjusting a variation of a reference voltage signal corresponding to a variable frequency of the drive current signal and decreasing a phase difference between the AC input voltage signal and the drive current.

According to aspects of the present disclosure, a power factor correcting circuit and a method for correcting a power factor in an AC direct lighting apparatus are disclosed that automatically select a frequency of an input voltage signal without separate, additional circuitry to drive the lighting apparatus.

In one example of the disclosure, the power factor correcting circuit includes a valley signal generating unit configured to receive a full-wave rectified AC input voltage signal, and configured to compare an internal reference voltage signal and the AC input voltage signal to generate a valley signal, a reference voltage control unit configured to receive the generated valley signal and count clock cycles of an internal clock to detect a frequency of the AC input voltage signal and configured to determine a frequency of the drive current signal to control a reference voltage signal based on the determined frequency of the drive current and a reference voltage control clock generating unit configured to generate a pulse width modulation signal associated with a pulse width of the reference voltage signal and configured to generate the reference voltage control clock signal based on the generated pulse width modulation signal and the controlled reference signal.

The reference voltage control unit may include a drive current frequency determining module configured to receive the valley signal and count the clock cycles of the internal clock to detect a frequency of the AC input voltage signal and configured to determine the frequency of the drive current and a digital-analog converting (DAC) module configured to receive a digital value from the drive current frequency determining module to output the reference voltage signal.

The drive current frequency determining module may determine a slope change interval of the AC input voltage signal based on the determined frequency of the drive current.

The digital-analog converting module may count the clock cycles of the reference voltage control clock signal up to a specific number to step up or step down the reference voltage signal and to cause the reference voltage signal to follow the AC input voltage signal.

The reference voltage control unit may output a reference voltage signal corresponding to the reference voltage control clock signal by a step to control a phase of the drive current.

The reference voltage control clock generating unit may include a reference voltage providing module configured to receive the reference voltage signal, a pulse width modulation signal generating module configured to generate a pulse width modulation signal associated with the pulse width of the reference voltage signal and a reference voltage control clock generating module configured to compare the received reference voltage signal and the generated pulse width modulation signal to generate the reference voltage control clock signal.

The pulse width modulation signal generating module may include a charge switching element configured to receive the reference voltage control clock signal and turn ON or OFF based on the received reference voltage control clock signal, and a capacitive element configured to be charged when the charge switching element is turned OFF and to be discharged when the charge switching element is turned ON.

The reference voltage control clock generating module may include a comparing element configured to compare the reference voltage signal and the pulse width modulation signal and a storage element configured to generate the reference voltage control clock signal based on an output value of the comparing element.

The storage element may comprise a latch.

The circuit may further include a switch control unit configured to turn ON or turn OFF the drive switching element based on the reference voltage control clock signal.

The switch control unit may turn ON the drive switching element connected to supply the drive current to an LED module during a first interval of the reference voltage control clock signal, and may turn OFF the drive switching element during a second interval of the reference voltage control clock signal.

The drive switching element may supply the drive current to an inductor when the drive switching element is turned ON and may flow a current being charged on the inductor into the LED module through a diode when the drive switching element is turned OFF.

This Summary is provided to introduce a selection of concepts in a simplified form that are further described below in the Detailed Description. This Summary is not intended to limit the disclosure in any way, nor is it intended to be used as an aid in determining the scope of the claimed subject matter.

The power factor correcting circuit and method for correcting a power factor in an AC direct lighting apparatus, as well as related technologies, according to an example of the disclosure, may correct a power factor of a circuit by changing a frequency of a drive current signal to decrease a phase difference between an AC input voltage signal and the drive current signal.

The power factor correcting circuit and method for correcting a power factor in an AC direct lighting apparatus may correct a power factor of a circuit by adjusting a variation of a reference voltage signal to cause the reference voltage signal to correspond to a variable frequency of a drive current, decreasing a phase difference between an AC input voltage signal and the drive current.

The power factor correcting circuit and method for correcting a power factor in an AC direct lighting apparatus, according to the present disclosure, may automatically select a frequency of an input voltage signal without separate and/or additional circuitry to drive the lighting apparatus.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

The present disclosure is further described in the detailed description that follows.

DETAILED DESCRIPTION OF THE DISCLOSURE

The following detailed description is provided to assist the reader in gaining a comprehensive understanding of the methods, apparatuses, and/or systems described herein. The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Various changes, modifications, and equivalents of the systems, apparatuses and/or methods described herein will be apparent to one of ordinary skill in the art. Moreover, it is noted that like reference numerals represent similar parts throughout the several views of the drawings.

While terms such as "first," "second," and the like, may be used to describe various components, such components must not be understood as being limited to the terms. The terms are merely used to help the reader to distinguish one component from another.

It will be understood that when an element is referred to as being "connected to" or "connected with" another element, the element can be directly connected to the other element or intervening elements may also be present. In contrast, when an element is referred to as being "directly connected to" another element, no intervening elements are present, except where the context makes it clear that other intervening elements may be present. In addition, unless explicitly described to the contrary, the word "comprise" and variations such as "comprises" or "comprising," or synonyms such as "including" or "having," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1:
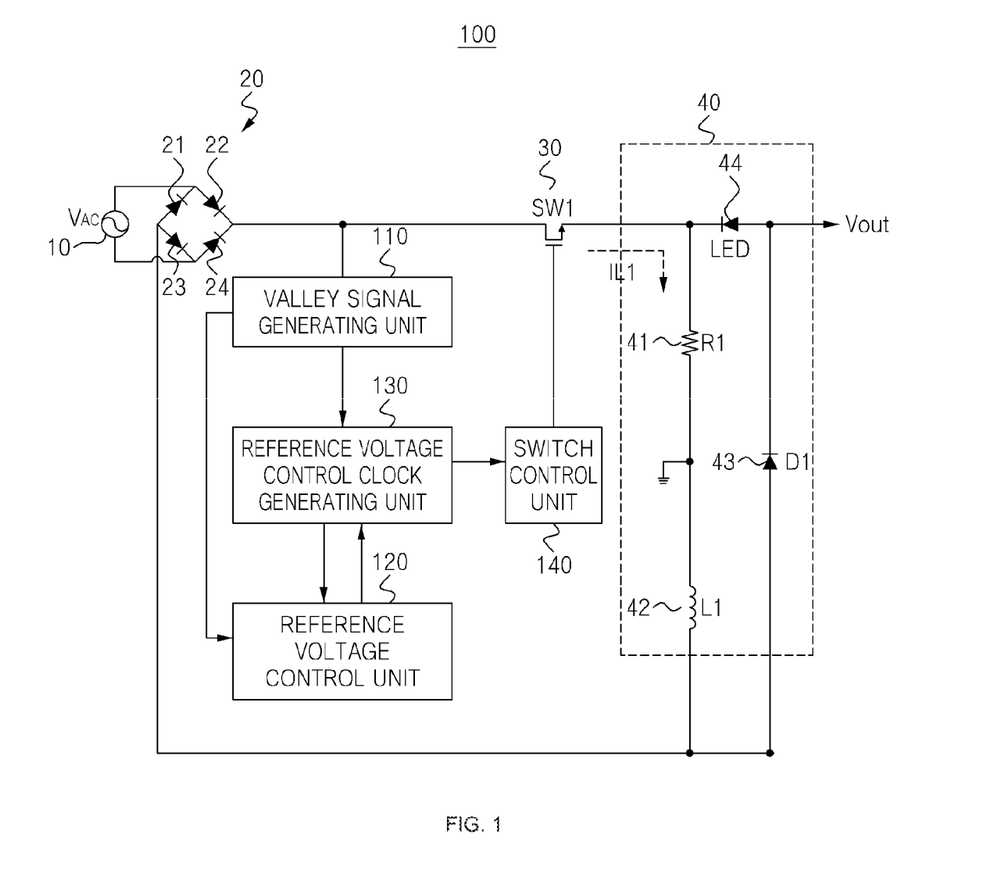
FIG. 1 is a block diagram illustrating an example of a power factor correcting circuit of an AC direct lighting apparatus, according to the present disclosure.

FIG. 1 is a block diagram illustrating an example of a power factor correcting circuit 100, according to the principles of the present disclosure. The power factor correcting circuit 100 may be included in an AC lighting apparatus, such as, for example, an LED lighting device.

Referring to FIG. 1, the power factor correcting circuit 100 includes an AC power source 10, a diode bridge 20, a valley signal generating unit 110, a reference voltage control unit 120, a reference voltage control clock generating unit 130, a switch control unit 140, a drive switching element 30 and a lighting unit 40. The AC power source 10 may include, for example, a residential power supply, or the like.

The AC power source 10 may include a power supply source that supplies an AC input voltage signal ($V_{AC}$) having a frequency of, for example, 50 Hz or 60 Hz, depending on the power provider. The AC input voltage signal ($V_{AC}$) may fluctuate according to a current distribution system (not shown). The frequency of the AC input voltage signal ($V_{AC}$) is not limited to 50 Hz or 60 Hz, but may, instead, have a different frequency value.

Figure 2:
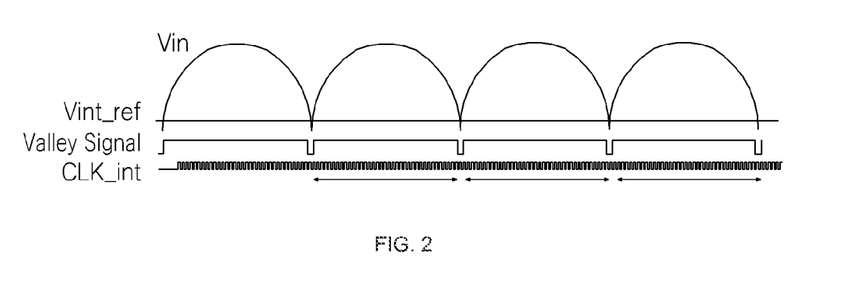
FIG. 2 is a waveform diagram illustrating an example of an operating condition of the valley signal generating unit in the power factor correcting circuit in FIG. 1.

The diode bridge 20 may be electrically connected to the AC power source 10. The diode bridge 20 may include a plurality of diodes 21 through 24. The diode bridge 20 may full-wave rectify the AC input voltage signal ($V_{AC}$), outputting a rectified AC input voltage signal (Vin), as shown in FIG. 2. The full-wave rectified AC input voltage (Vin) may be provided to an input of the valley signal generating unit 110.

The valley signal generating unit 110 may be connected to the diode bridge 20 and may receive the full-wave rectified AC input voltage (Vin). The valley signal generating unit 110 may compare an internal reference voltage (Vint_ref, shown in FIG. 2) and the AC input voltage (Vin) to generate a valley signal (also shown in FIG. 2). The internal reference voltage (Vint_ref) may be a predetermined voltage value that may be adjusted, such as, for example, increased or decreased from the value seen in FIG. 2.

Referring to FIGS. 1 and 2, a valley interval in the generated valley signal may correspond to an interval where a voltage value of the AC input voltage (Vin) is greater than that of the internal reference voltage (Vint_ref). That is, the valley signal may have a high value (e.g., "1") during an interval when the voltage value of the AC input voltage (Vin) is greater than the value of the internal reference voltage (Vint_ref).

The reference voltage control unit 120 may be connected to the valley signal generating unit 110 and the reference voltage control clock generating unit 130. The reference voltage control unit 120 may receive the valley signal from the valley signal generating unit 110 and count clock cycles of an internal clock to detect a frequency of the AC input voltage (Vin). Herein, the internal clock cycles may be counted at (e.g., a leading or trailing edge of) a valley interval of the AC input voltage (Vin). The internal clock signal may have a fixed dock cycle and may be directly generated in the reference voltage control unit 120. Alternatively, the internal clock signal may be received from an external clock generation circuit (not shown). The reference voltage control unit 120 may count the internal clock cycles during a prior valley interval of the full-wave rectified AC input voltage (Vin) to determine the frequency of the full-wave rectified AC input voltage (Vin).

Figure 6:
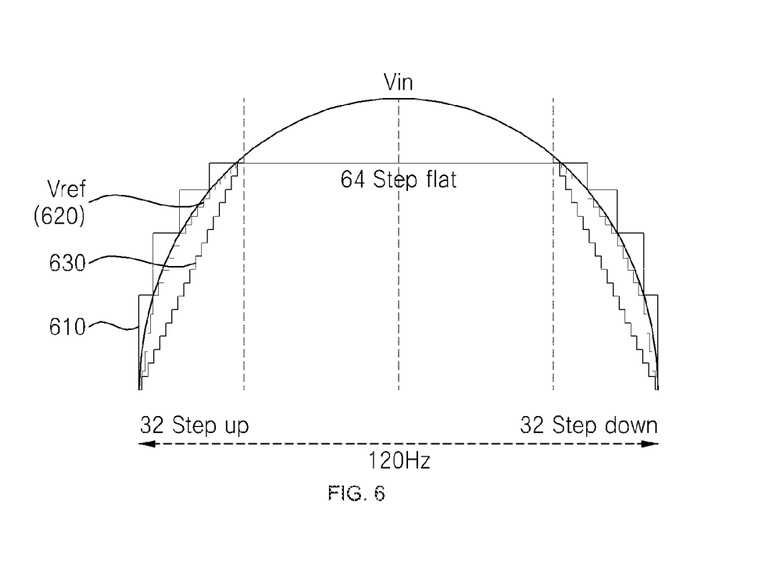
FIG. 6 is a waveform diagram illustrating an example of the reference voltage as controlled by the reference voltage control unit in the power factor correcting circuit of FIG. 1.

The reference voltage control unit 120 may determine a frequency of a drive current (IL1) based on the frequency of the AC input voltage (Vin) and control (or generate) a reference voltage signal (Vref, shown, e.g., in FIG. 6). The frequency of the drive current may be changed and the reference voltage control unit 120 may decrease a phase difference between the AC input voltage (Vin) and the drive current by controlling the frequency of the drive current.

The reference voltage control clock generating unit 130 may be connected to the valley signal generating unit 110 and the reference voltage control unit 120. The reference voltage control clock generating unit 130 may receive the AC input voltage (Vin) from the valley signal generating unit 110 and may receive the reference voltage (Vref) from the reference voltage control unit 120. The reference voltage control clock generating unit 130 may generate a pulse width modulation (PWM) signal (Vramp) associated with a pulse width of a corresponding reference voltage during a sub-interval 810 (shown in FIG. 8) of the AC input voltage (Vin). The reference voltage control clock generating unit 130 may generate a reference voltage control clock (CLK) based on the PWM signal (Vramp) and the reference voltage (Vref or VREF). The reference voltage control clock (CLK) may have a single cycle during two sub-intervals 810 (shown in FIG. 8). The reference voltage control clock (CLK) may change a pulse width according to a variation of the PWM signal (Vramp) and the reference voltage (Vref).

The switch control unit 140 may be connected to the reference voltage control clock generating unit 130 and the drive switching element 30. The switch control unit 140 may receive the reference voltage control clock (CLK) signal from the reference voltage control clock generating unit 130 and may control the drive switching element 30. The switch control unit 140 may turn ON the drive switching element 30 connected to an LED module 44 during a first interval of the reference voltage control clock (CLK), and may turn OFF the drive switching element 30 during a second interval of the reference voltage control clock (CLK). The drive switching element 30 may supply the drive current (IL1) to an inductor 42 when the drive switching element 30 is turned ON. When the drive switching element 30 is turned OFF, a current may be supplied from the inductor 42 to the LED module 44 through a diode 43. The drive current (IL1) may charge the inductor 42 when the drive switching element 30 is turned ON, and the LED module 44 may be driven when the drive switching element 30 is turned OFF and the current charged on the inductor 42 flows through the diode 43.

Accordingly, the reference voltage control unit 120 may generate the reference voltage (Vref) corresponding to the variable frequency of the drive current (IL1) and may decrease the phase difference between the AC input voltage (Vin) and the drive current (IL1).

The lighting unit 40 includes a detecting resistor 41, the inductor 42, the diode 43 and the LED module 44.

The drive switching element 30 may be connected to the detecting resistor 41. The drive switching element 30 may be, or may include a transistor, such as, e.g., a field-effect transistor (FET), a metal-oxide-semiconductor FET (MOSFET), or the like. The switch control unit 140 may provide a current to, for example, a gate terminal of the transistor to control the flow of the drive current (IL1) between the source and drain terminals of the transistor. Therefore, the transistor may be operated as the drive switching element 30 of the power factor correcting circuit 100.

When the drive switching element 30 is turned ON, the drive current (IL1) may flow through the drive switching element 30 to the detecting resistor 41 and the inductor 42, and energy of the drive current (IL1) may be stored in the inductor 42. When the drive switching element 30 is turned OFF, the energy stored in the inductor 42 may be provided to the LED module 44. That is, when the drive switching element 30 is turned OFF, the energy stored in the inductor 42 may be released and the inductor 42 may function as a current source. The current flows into the LED module 44 through the diode 43 based on the energy stored in the inductor 42, so that the LED module 44 may be driven. The drive current (IL1) may be varied (e.g., increased or decreased) to adjust a brightness of the LED module 44, so as to, e.g., brighten or dim an output of the AC direct lighting apparatus.

FIG. 2 is a waveform diagram illustrating an operating condition of the valley signal generating unit 110 in FIG. 1.

The valley signal generating unit 110 may compare the internal reference voltage (Vint_ref) and the AC input voltage (Vin) to detect a valley interval of the AC input voltage (Vin) and to generate the valley signal. The valley interval in the generated valley signal may correspond to an interval where a value of the AC input voltage (Vin) is larger than that of the internal reference voltage (Vint_ref). That is, the valley signal may have a high value (e.g., "1") during an interval that the value of the AC input voltage (Vin) is larger than the value of the internal reference voltage (Vint_ref). The valley signal may have a low value (e.g., "0") during an interval that the value of the AC input voltage (Vin) is lower than the value of the internal reference voltage (Vint_ref).

The reference voltage control unit 120 may receive the valley signal from the valley signal generating unit 110 and count the cycles of the internal dock signal (CLK_int) to determine a cycle of the valley interval. As a result, the reference voltage control unit 120 may detect the frequency of the AC input voltage (Vin) based on the cycle of the valley interval.

Figure 3:
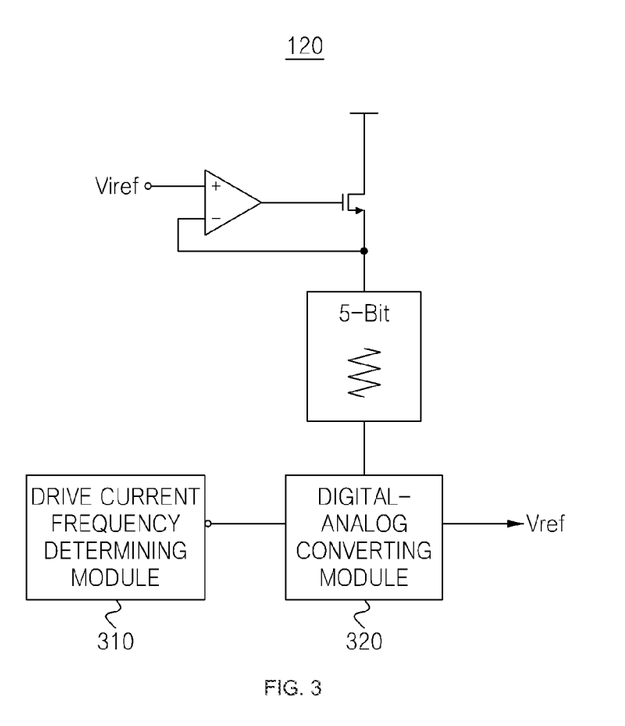
FIG. 3 is a block diagram illustrating an example of the reference voltage control unit in the power factor correcting circuit in FIG. 1.

FIG. 3 is a block diagram illustrating an example of a reference voltage control unit 120 that may be included in the power correcting circuit 100 in FIG. 1.

Referring to FIG. 3, the reference voltage control unit 120 may include a drive current frequency determining module 310 and a digital-analog converting (DAC) module 320.

The drive current frequency determining module 310 may receive the valley signal from the valley signal generating unit 110 to detect the frequency of the AC input voltage (Vin). The drive current frequency determining module 310 may determine the frequency of the drive current (IL1) based on the frequency of the AC input voltage (Vin). Accordingly, the power factor correcting circuit 100 may automatically select the frequency of the AC input voltage (Vin), without need of separate or additional circuitry to drive the LED module 44.

The drive current frequency determining module 310 may generate a digital value according to the frequency of the drive current (IL1). That is, when the digital value is determined based on the frequency of the drive current, the frequency of the drive current determining module 310 may result in the generation of the reference voltage (Vref) with a specific frequency.

The DAC module 320 may generate the reference voltage (Vref) based on the frequency determined by the drive current frequency determining module 310. That is, the DAC module 320 may receive the digital value from the drive current frequency determining module 310 and output the reference voltage (Vref) based on the received digital value.

Figure 4:
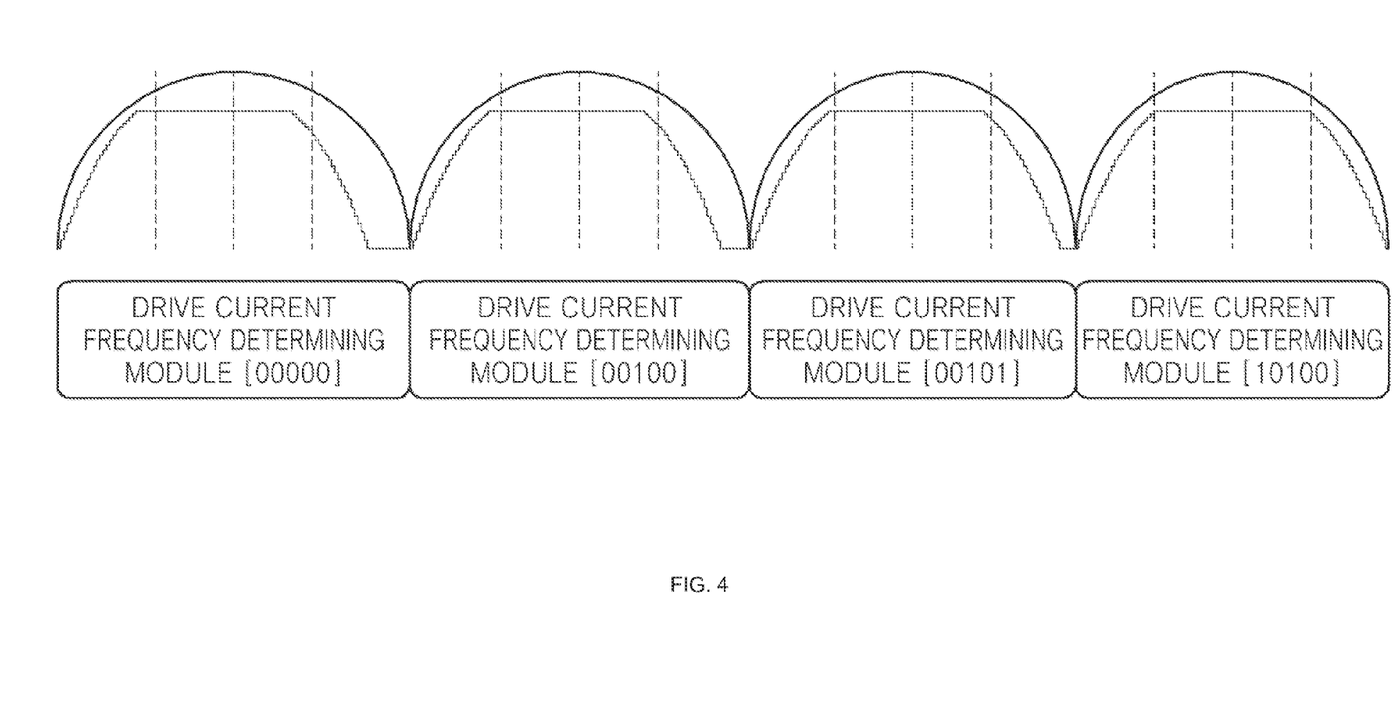
FIG. 4 is a waveform diagram illustrating an example of the reference voltage as controlled by the reference voltage control unit in the power factor correcting circuit in FIG. 1.

FIG. 4 is a waveform diagram illustrating an example of a reference voltage (Vref) output by the reference voltage control unit 120 (shown in FIGS. 1 and 3).

Referring to FIGS. 3 and 4, the drive current frequency determining module 310 may provide the digital value to the DAC module 320, and the DAC module 320 may output the reference voltage (Vref). According to an aspect of the disclosure, when the digital value is, e.g., [00000], the phase difference between the reference voltage (Vref) and the AC input voltage (Vin) may be such that reactive power is generated and power dissipation occurs. As the digital value is gradually increased, the phase difference between the reference voltage (Vref) and the AC input voltage (Vin) may decrease. When the digital value reaches, e.g., [10100], any phase difference between the reference voltage (Vref) and the AC input voltage (Vin) may be eliminated and the two signals may be in-phase. As a result, the DAC module 320 may receive the digital value corresponding to [10100] to output the reference value (Vref) with the specific frequency. The foregoing examples of digital values are used for conveniences' sake to explain an aspect of the disclosure, but are in no way limiting, as different digital values may be readily used, as one of ordinary skill in the art recognizes.

As seen in FIG. 6, the drive current frequency determining module 310 may determine a slope change interval 610 of the AC input voltage (Vin) based on the determined frequency of the drive current (IL1), and the DAC module 320 may count the reference voltage control clock (CLK) cycles to step-up or step-down the reference voltage (Vref) to follow the AC input voltage (Vin). Accordingly, the power factor correcting circuit 100 may adjust a variation of the reference voltage (Vref) to cause the reference voltage (Vref) to correspond to and track the variable frequency of the drive current (IL1), thereby correcting a power factor of the circuit.

Figure 5:
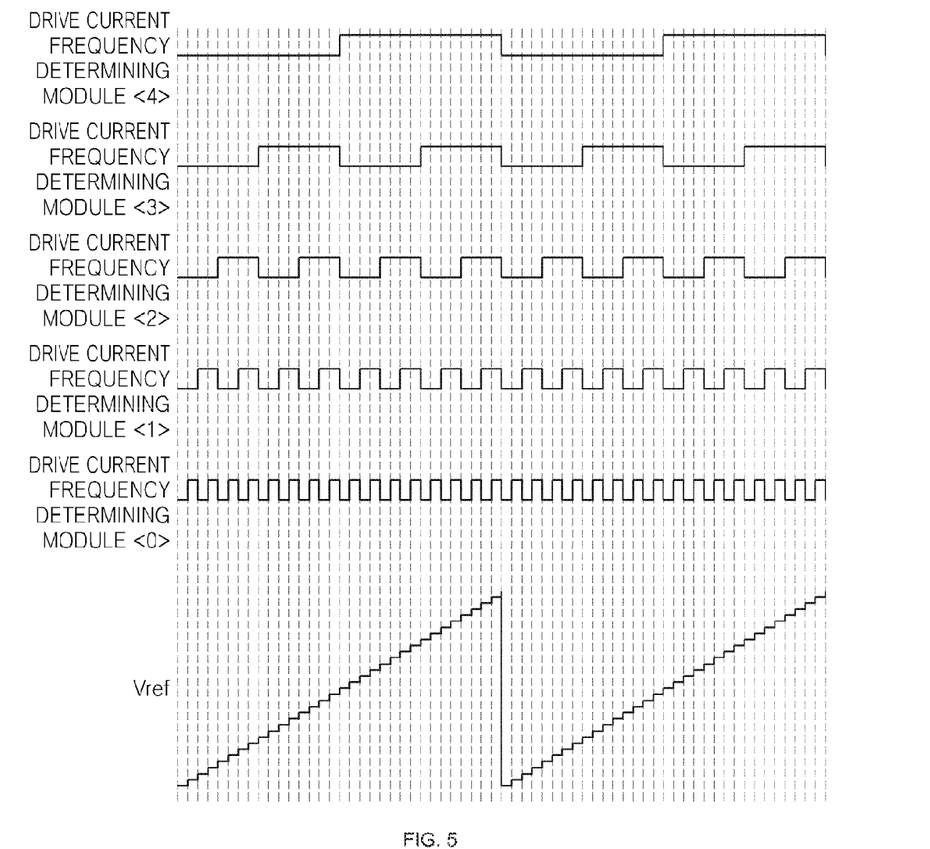
FIG. 5 is a timing diagram illustrating an operating condition of a DAC module in the reference voltage control unit of FIG. 3.

FIG. 5 is a timing diagram illustrating an operating condition of the DAC module 320, shown in FIG. 3. The DAC module 320 may include, for example, a 5-bit digital to analog converter. The waveform shown in FIG. 5 corresponds to an operating condition of a 5-bit DAC.

Referring to FIGS. 1 and 5, the reference voltage control unit 120 may perform 32 step-up, 64 flat and 32 step-down operations through the 5-bit DAC. According to the present example, the 32 step-up operation may represent that the reference voltage (Vref) is stepwisely increased through 32 steps (e.g., when four steps represent a single interval, then 32 steps may include 128 clock cycles). The 64 flat operation may represent that the reference voltage (Vref) is consistently maintained through 64 steps (e.g., when four steps represent a single interval, then 64 steps may include 256 clock cycles). The 32 step-down operation may represent that the reference voltage (Vref) is stepwisely decreased through 32 steps (e.g., when four steps represent a single interval, then 32 steps may include 128 clock cycles). Therefore, when the drive current frequency determining module 310 designates four slope change intervals 610

(shown in FIG. 6), each of the four slope change intervals 610 may perform 8 step-up or 8 step-down operations.

FIG. 6 is a waveform diagram illustrating an example of the reference voltage controlled by the reference voltage control unit 120, shown in FIG. 1.

Referring to FIG. 6, waveform 630 represents a reference voltage using a conventional power factor correcting circuit (not shown), which consistently increases the step-signal to generate a phase difference between the AC input voltage (Vin) and an output current. As seen in waveform 630, the conventional power factor correcting circuit is limited in correcting the power factor and, thereby, decreasing power dissipation. However, the reference voltage control unit 120 may determine slope change intervals 610 and control the reference voltage (VREF) 620 with a different level in each of the slope change intervals 610, so that the reference voltage control unit 120 outputs a waveform of the reference voltage (VREF) 620 similar to the waveform of the AC input voltage (Vin). As a result, the reference voltage control unit 120 may adjust a timing of the output current (IL1) to control the reference voltage (VREF) 620 so that a phase of the output current (IL1) corresponds to that of the AC input voltage (Vin).

According to principles of the instant disclosure, the drive current frequency determining module 310 may designate the four slope change intervals 610 when the AC input voltage (Vin) increases or decreases. Accordingly, as a slope of the AC input voltage (Vin) changes, a slope of each of the slope change intervals 610 may change. For example, the slope of the slope change interval 610 may gradually decrease when the AC input voltage (Vin) increases, and the slope of the slope change interval 610 may gradually increase when the AC input voltage (Vin) decreases. Because the slope in the slope change interval 610 is changed, the variation of the reference voltage (Vref) may be changed.

Referring to FIG. 1, when the drive switching element 30 is turned ON, the drive current (IL1) may flow through the drive switching element 30 to the inductor 42; and, when the drive switching element 30 is turned OFF, current may be prevented from flowing through the drive switching element 30 and the current charged in the inductor 42 may flow into the LED module 44 through the diode 43. The drive current (IL1) may charge the inductor 42 and the LED module 44 may be driven when the current charged in the inductor 42 flows into the LED module 44 through the diode 43.

Figure 7:
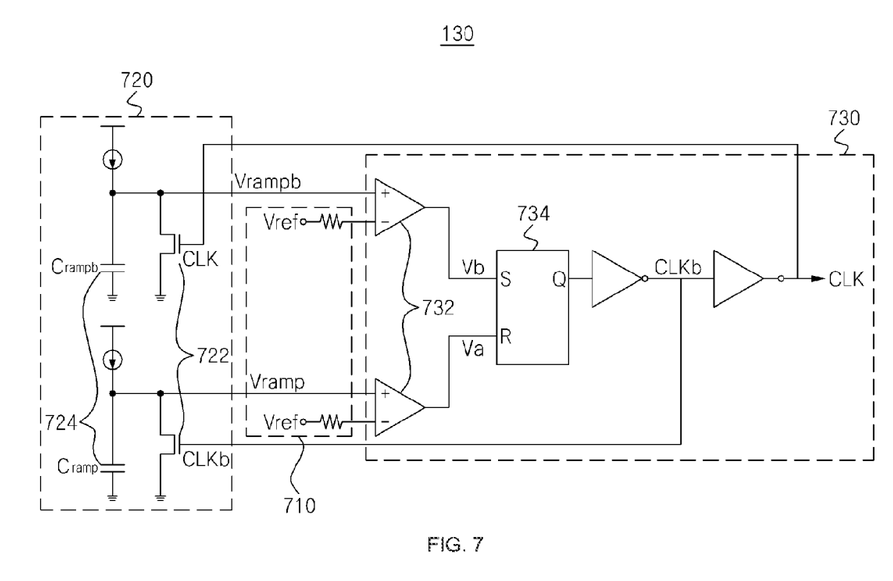
FIG. 7 is a circuit diagram illustrating an example of the reference voltage control clock generating unit in the power factor correcting circuit in FIG. 1.

FIG. 7 is a circuit diagram illustrating an example of a reference voltage control clock generating unit that may be included in the power factor correcting circuit 100, shown in FIG. 1.

Referring to FIG. 7, the reference voltage control clock generating unit 130 may include a reference voltage providing module 710, a PWM signal generating module 720 and a reference voltage control clock generating module 730.

The reference voltage providing module 710 may receive the reference voltage (Vref) generated in the reference voltage control unit 120 (shown in FIG. 1). For instance, referring to the example shown in FIG. 3, the reference voltage providing module 710 may receive the reference voltage (VREF) from the DAC module 320 to provide the reference voltage (VREF) to the reference voltage control clock generating module 730.

The PWM signal generating module 720 may include a pair of charge switching elements 722 and a pair of capacitive elements 724. The charge switching element(s) 722 may receive the reference voltage control clock (CLK) signal and be turned ON and OFF based on the clock cycles of the CLK signal. The capacitive element 724 may be charged when the charge switching element 722 is turned OFF and may be discharged when the charge switching element 722 is turned ON.

Figure 8:
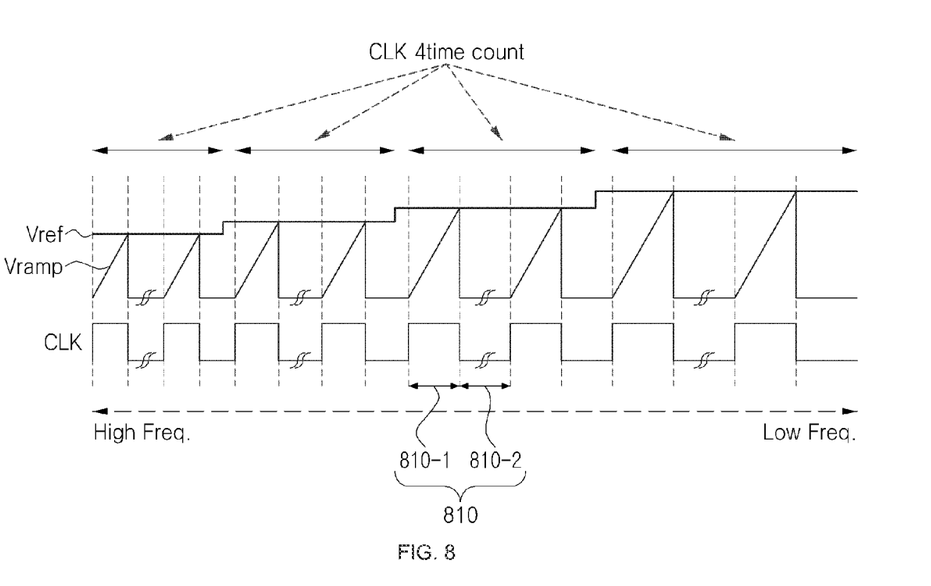
FIG. 8 is a timing diagram illustrating an operating condition of the reference voltage control clock generating unit in the power factor correcting circuit in FIG. 1.

The PWM signal generating module 720 may generate the PWM signal (Vramp, shown in FIG. 8) associated with the pulse width of the corresponding reference voltage (Vref) during the sub-interval of the AC input voltage (Vin). Referring to FIGS. 7 and 8, a pulse width of the PWM signal (Vramp) may linearly increase during a first sub-interval 810-1 (e.g., a turn-OFF interval of the charge switching element 722) and the PWM signal (Vramp) may suddenly decrease in a second sub-interval 810-2 (e.g., a turn-ON interval of the charge switching element 722), thereby a value of the pulse width modulation signal (Vramp) may be substantially zero. In one embodiment of the disclosure, the charge switching element(s) 722 may be implemented as the transistor. Thus, the PWM signal (Vramp) may represent a voltage provided to both sides of the capacitive element(s) 724 and may be implemented as a sawtooth wave type.

The reference voltage control clock generating module 730 may include comparing elements 732 and a storage element 734. The comparing elements 732 may be connected to the reference voltage providing module 710 and the PWM signal generating module 720. The comparing elements 732 may compare the reference voltage (Vref) and the PWM signal (Vramp) to provide a comparison value to the storage element 734. The storage element 734 may generate the reference voltage control clock (CLK) based on the comparison value. In one embodiment of the disclosure, the comparing elements 732 may be implemented by an operational amplifier (OP amp) and the storage element 734 may be implemented by an SR (Set-Reset) latch.

The reference voltage control clock generating module 730 may compare the received reference voltage (Vref) and the generated PWM signal (Vramp) to generate the reference voltage control clock (CLK). The cycles of the generated reference voltage control dock (CLK) signal may be counted by the reference voltage control unit 120 to control the reference voltage (Vref). That is, the generated reference voltage control clock (CLK) signal may be provided to the DAC module 320 (shown in FIG. 3) to cause the DAC module 320 to generate the reference voltage (Vref) of a next step.

In an embodiment of the disclosure, the reference voltage control clock generating module 730 may receive the reference voltage (Vref) and the PWM signal (Vramp) at the SR latch and compare the signals. An output of the SR latch may connect to and pass the comparison result value to a NOT gate to generate the reference voltage control clock (CLK) signal.

FIG. 8 is a timing diagram illustrating an operating condition of the reference voltage control clock generating unit 130 shown in FIG. 1 (or FIG. 7).

Referring to FIG. 8, the reference voltage control unit 120 may count four reference voltage control clock (CLK) cycles to output the reference voltage (Vref) by a step. The reference voltage control clock (CLK) signal may have a single cycle during two sub-intervals 810. A step may include a step-up, a flat step or a step-down according to an interval of the reference voltage (Vref). As a result, the reference voltage control unit 120 may step-up or step-down based on the slope change interval 610 (shown in 6) to control a phase of the reference voltage (Vref) and may adjust the timing of the drive current (IL1) to control the phase of the drive current (IL1) based on the phase of the AC input voltage (Vin). As a result, the power factor correcting circuit 100 may decrease the phase difference between the drive current (IL1) and the AC input voltage (Vin), thereby correcting the power factor of the circuit.

Figure 9:
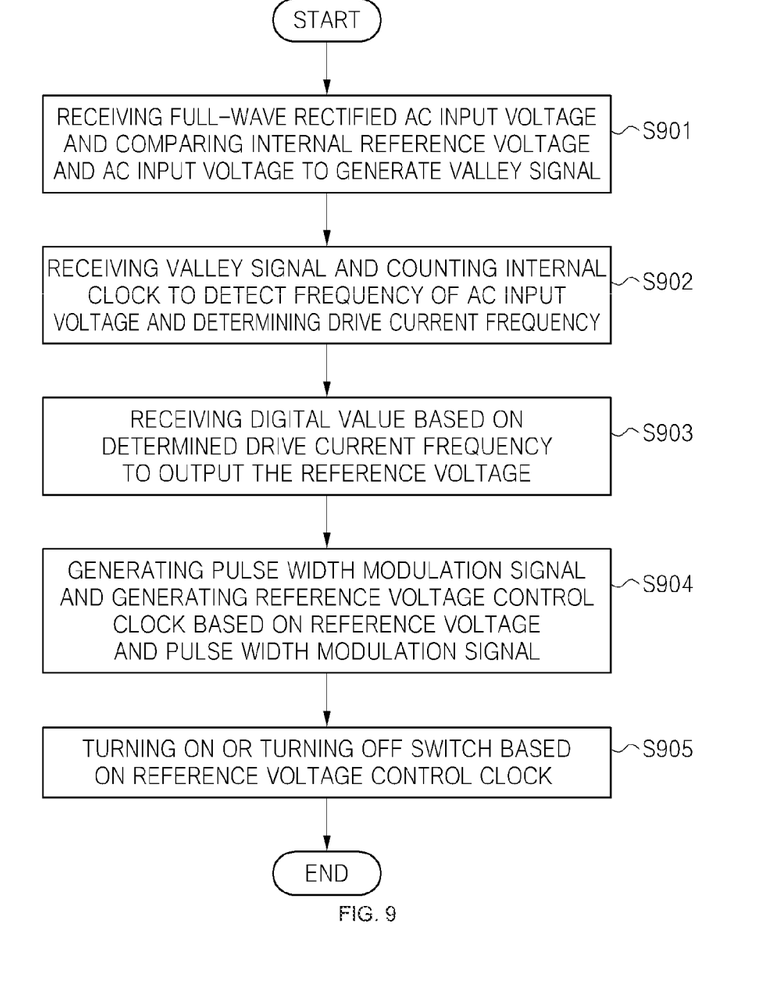
FIG. 9 is a flowchart illustrating an example of a power factor correcting method for an AC direct lighting apparatus, according to the present disclosure.

FIG. 9 is a flowchart illustrating an example of a power factor correcting method that may be implemented in a AC direct lighting apparatus, according to the present disclosure.

Referring to FIGS. 1 and 9, the valley signal generating unit 110 may receive the full-wave rectified AC input voltage (Vin) and may compare the internal reference voltage (Vref) and the AC input voltage (Vin) to generate the valley signal. A cycle of the valley signal may be determined based on a number of the internal clock (CLK_int) signal cycles counted during a single cycle of the AC input voltage (Vin) (Step S901).

The drive current frequency determining module 310 may receive the valley signal and may count the internal clock (CLK_int) signal cycles to detect the frequency of the AC input voltage (Vin) and to determine the frequency of the drive current. The drive current frequency determining module 310 may determine the slope change interval 610 (shown in FIG. 6) of the AC input voltage (Vin) based on the frequency of the drive current (Step S902).

The DAC module 320 (shown in FIG. 3) may receive the digital value from the drive current frequency determining module 310 to output the reference voltage (Vref). The DAC module 320 may count the reference voltage control clock (CLK) cycles up to a specific number to step-up or step-down the reference voltage (Vref) and to cause the reference voltage to follow the AC input voltage (Vin) (Step S903).

The reference voltage control clock generating unit 130 may generate the PWM signal (Vramp) and may generate the reference voltage control clock (CLK) signal based on the PWM signal (Vramp). The generated reference voltage control clock (CLK) signal may be provided to the DAC module 320 and the DAC module 320 may control the reference voltage (Vref) of the next step (Step S904).

The switch control unit 140 may turn ON or turn OFF the drive switching element 20 based on the reference voltage control clock (CLK). The switch control unit 140 may turn ON the drive switching element 30 connected to the LED module 44 during the first interval of the reference voltage control clock (CLK) and may turn OFF the drive switching element 30 during the second interval of the reference voltage control clock (CLK). When the drive switching element 30 is turned ON, the drive current (IL1) may flow into the detecting resistor 41 and the inductor 42 and the energy of the drive current (IL1) may be stored in the inductor 42. When the drive switching element 30 is turned OFF, the current may flow into the LED module 44 through the diode 43 based on the energy stored in the inductor 42 and the LED module 44 may be driven (Step S905).

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed is:

1. A power factor correcting circuit for an AC direct lighting apparatus, the circuit comprising:
   a valley signal generating unit that receives a full-wave rectified AC input voltage signal, and compares an internal reference voltage signal and the AC input voltage signal to generate a valley signal;
   a reference voltage control unit that receives the valley signal, counts clock cycles of a clock signal to detect a frequency of the AC input voltage signal, and determines a frequency of a drive current to control a reference voltage signal based on the frequency of the drive current; and
   a reference voltage control clock generating unit that generates a pulse width modulation (PWM) signal associated with a pulse width of the reference voltage signal, and generates a reference voltage control clock signal based on the PWM signal and the reference voltage signal.

2. The circuit of claim 1, wherein the reference voltage control unit comprises:
   a drive current frequency determining module that receives the valley signal, counts the clock cycles of the clock signal to detect the frequency of the AC input voltage signal, and determines the frequency of the drive current; and
   a digital-analog converting module that receives a digital value from the drive current frequency determining module to output the reference voltage signal.

3. The circuit of claim 2, wherein the drive current frequency determining module determines a slope change interval of the AC input voltage signal based on the frequency of the drive current.

4. The circuit of claim 2, wherein the digital-analog converting module counts clock cycles of the reference voltage control clock signal up to a specific number to step-up or step-down the reference voltage signal and to cause the reference voltage signal to follow the AC input voltage signal.

5. The circuit of claim 2, wherein the reference voltage control unit generates the reference voltage signal based on the reference voltage control clock signal according to a step to control a phase of the drive current.

6. A power factor correcting circuit for an AC direct lighting apparatus, the circuit comprising:
   a valley signal generating unit that receives a full-wave rectified AC input voltage signal and compares an internal reference voltage signal and the AC input voltage signal to generate a valley signal;
   a reference voltage control unit that receives the valley signal, counts clock cycles of a clock signal to detect a frequency of the AC input voltage signal, and determines a frequency of a drive current to control a reference voltage signal based on the determined frequency of the drive current; and
   a reference voltage control clock generating unit that generates a pulse width modulation signal associated with a pulse width of the reference voltage signal, and generates a reference voltage control clock signal based on the generated pulse width modulation signal and the reference voltage signal,
   wherein the reference voltage control clock generating unit comprises:
      a reference voltage providing module that receives the reference voltage;
      a pulse width modulation signal generating module that generates the pulse width modulation signal based on the pulse width of the reference voltage signal; and
      a reference voltage control clock generating module that compares the received reference voltage signal and the generated pulse width modulation signal to generate the reference voltage control clock signal.

7. The circuit of claim 6, wherein the pulse width modulation signal generating module comprises:
a charge switching element that receives the reference voltage control clock signal, and turns ON or turns OFF based on the reference voltage control clock signal; and
a capacitive element that is charged when the charge switching element is turned ON and is discharged when the charge switching element is turned OFF.

8. The circuit of claim 6, wherein the reference voltage control clock generating module comprises:
a comparing element that compares the reference voltage signal and the pulse width modulation signal; and
a storage element that generates the reference voltage control clock signal based on an output value of the comparing element.

9. The circuit of claim 8, wherein the storage element comprises a latch.

10. The circuit of claim 1, further comprising:
a drive switching element that controls a flow of the drive current; and
a switch control unit that turns ON or turns OFF the drive switching element based on the reference voltage control clock signal.

11. The circuit of claim 10, wherein the switch control unit turns ON the drive switching element to supply the drive current to an LED module during a first interval of the reference voltage control clock signal, and turns OFF the drive switching element during a second interval of the reference voltage control clock signal.

12. The circuit of claim 11, wherein the drive switching element supplies the drive current to an inductor when the drive switching element is turned ON, and the inductor supplies the drive current charged therein to the LED module when the drive switching element is turned OFF.

13. A power factor correcting circuit, comprising:
a valley signal generating unit that receives an input voltage signal and generates a valley signal based on the input voltage signal and an internal reference voltage signal;
a reference voltage control unit that receives the valley signal from the valley signal generating unit, detects a frequency of the input voltage signal based on the valley signal, determines a frequency of a drive current based on the frequency of the input voltage signal, and generates a reference voltage signal based on the frequency of the drive current; and
a reference voltage control clock generating unit that generates a pulse width modulation (PWM) signal associated with a pulse width of the reference voltage signal, and generates a reference voltage control clock signal based on the PWM signal and the reference voltage signal.

14. The power factor correcting circuit of claim 13, wherein the reference voltage control unit comprises:
a drive current frequency determining module that receives the valley signal, counts a number of clock cycles of a clock signal during a valley interval of the valley signal, detects the frequency of the input voltage signal based on the number of the clock cycles, determines the frequency of the drive current based on the frequency of the input voltage signal, and generates a digital value representing the frequency of the drive current; and
a digital-analog converting (DAC) module that receives the digital value and generates the reference voltage signal based on the digital value.

15. The power factor correcting circuit of claim 13, wherein the reference voltage control clock generating unit includes:
a reference voltage providing module that receives the reference voltage signal;
a PWM signal generating module that generates the PWM signal based on the pulse width of the reference voltage signal; and
a reference voltage control clock generating module that generates the reference voltage control clock signal based on comparison between the reference voltage signal and the PWM signal.

16. A lighting apparatus comprising the power factor correcting circuit of claim 13, the light apparatus further comprising:
a lighting unit comprising a light-emitting diode (LED) module;
a drive switching element that controls a flow of the drive current to the lighting unit; and
a switch control unit that is connected to the power factor correcting circuit and controls the drive switching element based on the reference voltage control clock signal.

17. The light apparatus of claim 16, wherein the switch control unit turns on the drive switching element during a first interval of the reference voltage control clock signal, and turns off the drive switching element during a second interval of the reference voltage control clock signal.

18. The lighting apparatus of claim 16, wherein the lighting unit further comprises an inductor coupled between the drive switching element and the LED module, and
wherein the inductor is charged with the drive current provided from the drive switching element when the drive switching element is turned on, and the drive current charged in the inductor is supplied to the LED module when the drive switching element is turned off.

19. The light apparatus of claim 18, wherein the lighting unit further comprises a diode coupled between the inductor and the LED module.

20. The light apparatus of claim 16, further comprising:
a power source that provides an AC input voltage signal; and
a diode bridge that is coupled between the power source and the drive switching element and rectifies the AC input voltage signal from the power source and outputs an AC full-wave rectified input signal to the power factor correcting circuit as the input voltage signal.

* * * * *